United States Patent [19]

Grignon

[11] Patent Number: 4,514,448
[45] Date of Patent: Apr. 30, 1985

[54] HARDBOARD-LIKE PANEL
[75] Inventor: Jacques Grignon, Neuville, Canada
[73] Assignee: Domtar Inc., Montreal, Canada
[21] Appl. No.: 454,072
[22] Filed: Dec. 28, 1982
[51] Int. Cl.³ .................. B32B 11/02; B32B 11/04
[52] U.S. Cl. .................................. 428/68; 428/74; 428/304.4; 428/489; 428/490; 428/920
[58] Field of Search .................. 428/68, 70, 74, 76, 428/326, 489, 490, 409, 920, 304.4; 156/71, 237; 52/309.13

[56] References Cited
U.S. PATENT DOCUMENTS 1,927,879  9/1933  Spafford .......................... 428/74
1,942,162  1/1934  Campbell ......................... 428/74
2,325,055  7/1943  Heritage ......................... 428/490
4,301,198  11/1981 Prior ............................. 428/74
4,399,186  8/1983  Lauderback ...................... 428/920

Primary Examiner—Paul J. Thibodeau

[57] ABSTRACT

Hardboard-like panel having a core of wood fibres intimately mixed with asphalt forming 10-30% by weight of the core. The core is porous and contains 50% by volume of air cells. A resin-impregnated paper is glued to the core. The panel is preferably coated with a long life thermosetting acrylic finish, and used as an exterior siding. A process for making same is also described.

4 Claims, 1 Drawing Figure

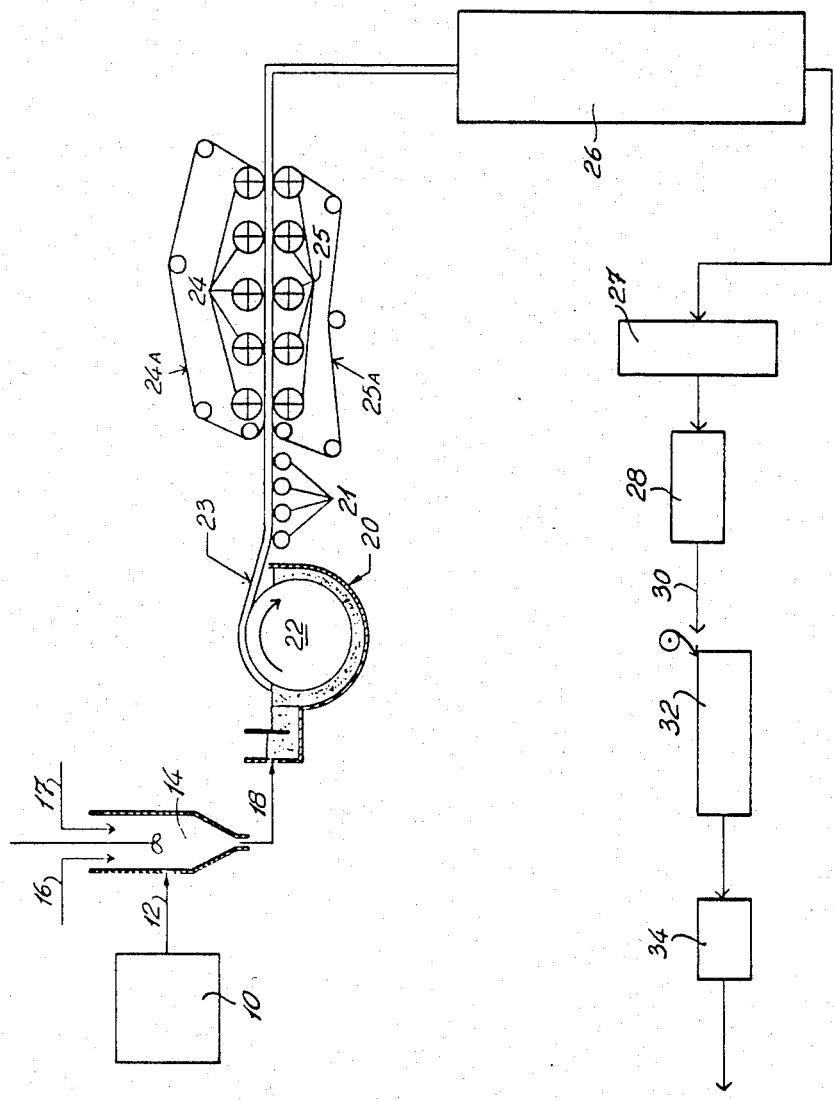

HARDBOARD-LIKE PANEL

FIELD OF THE INVENTION

This invention relates to new panels which are light and yet possess the strength encountered with hardboard panels and to a process for making the same.

BACKGROUND OF THE INVENTION

One of the methods for making hardboard panels, consists in digesting sawdust and shavings, defibering same through a refiner zone. Then the resulting stock which is highly diluted in water together with other conventional additives is put into contact with a perforated roll to produce a mat which is then squeezed in between press rolls to be finally dried.

Today, hardboard panel is one of the most commonly used materials for making exterior sidings, these compete against vinyl and aluminum sidings. However, hardboard panel is heavy, transportation cost is also higher, as compared against other sidings. This is even more so as energy cost rises.

In order to qualify for exterior sidings, a panel must be rigid, be able to withstand high variation in temperature, various degrees of humidity and high sun intensity. The temperature gradient in siding is very high at times: one side may be near room temperature, while the other side is well below freezing temperature or at 140°–190° F.

BRIEF DESCRIPTION OF THE INVENTION

The present invention aims at producing a hardboard like material which would be at least comparable in properties and yet would be lighter.

In a particular embodiment the invention provides an exterior siding with sufficient strength which has general properties comparable to other existing sidings and yet has improved characteristics insofar as th rmal resistance and linear expansion is concerned and, is much lighter in comparison to hardboard exterior sidings: in the order of 20 lb./in$^2 \pm 4$ for instance. It is easy to cut with an ordinary saw, to nail with normal galvanized nails and to handle in lengths of 8 and even 12 feet.

Broadly stated the invention is directed to a hardboard-like, rigid and light panel having a core, and a wrapping enclosure surrounding said core, said core comprising wood fibres intimately mixed and coated with asphalt, said asphalt being 10–30% by weight of said core, and at least 50% by volume of said core being voids made up by air cells, said wrapping enclosure comprising a resin-impregnated paper glued onto said core, strengthening it, and forming a hard shell-like enclosure. Generally, the panel has a thermal resistance as defined by R of at least 0.8 and preferably above 1.2–1.3. and to a method for making same.

In a preferred embodiment the panel comprises asphalt in an amount of 15–25% by weight of said core, and 60 to 75 by volume of said core is made up of air cells.

Broadly stated the method comprises: over a perforated surface, laying a highly diluted wood-fibre in suspension in an aqueous medium containing dispersed therein, between 10–30% of asphalt by weight of said fibres, said medium having a pH within the range of 4 and 4.5; removing water therefrom until a mat is obtained, removing said mat from said rotating surface and further expelling water therefrom and drying it, and forming a core therewith, and gluing a resin-impregnated paper to said core to strengthen it to firmly bind it.

Preferably the core and the resin-impregnated paper are glued together with a thermoplastic adhesive, and the paper is heat set over said core.

Further features, objects and advantages will be evident from the following detailed description of the preferred embodiments of he present invention, taken in conjunction with the accompanying drawing in which:

FIG. 1 is a schematic illustration of one form of system for making the hardwood-like light panel in accordance with the present invention.

Referring now to the FIGURE a highly diluted wood fibre suspension, in the order of about 1%–2% solid in an aqueous medium obtained for instance by digesting shavings and saw dust, and refining and defibering same, is contained in reservoir 10. Said wood fibre in suspension is fed to a mixed 14 via line 12. While simultaneously line 16 delivers into said mixer a predetermined amount of asphalt. The asphalt may be in powder form, i.e. pulverized asphalt or in suspension, the powder having been previously mixed with water, but is preferably fed as an aqueous emulsion. This emulsion is obtained commercially or is made with suitable carriers as is known in the art. If desired into said mixer is also added sizes and other additives to adjust pH, by line 17. From said mixer 14 the highly diluted wood fibre—asphalt emulsion containing 1–2% solid is pumped into reservoir 20 via line 18. This reservoir may conveniently be that of an Oliver TM filter machine. Partly within the reservoir 20 a rotating vacuum roller 22 having perforated surface receives the suspension from reservoir 20. The wood fibres—asphalt components adhere to said perforated surface by means of the vacuum created within said roller 22.

As the vacuum roller rotates up, it accumulates sufficient solid to form a mat 23 with less and less water removed by vacuum. The mat which is displaced over a plurality of rollers 21, is freed from another portion of its water by moving in between a plurality of squeezing rollers 24 and 25 mounted in tandem, while the mat 23 is held in between the endless belts 24a and 24b. The mat 23 is then heat dryed in a dryer 26, for instance a COE TM steam dryer which uses both radiation and convection for heating, to form a slab which can be cut to the desired or suitable size through panel saw 27 and shaper 28 for making the core 30 of a simulated hardwood panel. Then inside laminator 32 the core 30 is wrapped with a resin-impregnated paper 35 which is simultaneously glue coated on its inside, (side adjacent to core 30). If desired, instead the core 30 may be glued and the resin-impregnated paper 35 may then simply be wrapped around the glued core 30. Known laminators include type DUP, which are available at Reinhard Duspohl in Germany, Berg TM Wrapping machines for making veneer, available at Reitberg Germany, or such laminators as are available at Helmut Friz in Germany. The resin-impregnated paper is wrapped over the core 30 in the laminator 32 by means of a plurality of rollers able to turn the resinous paper around said core. The glue is kept plastic by hot air gun also within said laminator 32. In this instance, the glue must be of the hotmelt type that adheres quickly when heat activated such as by hot air guns, and it must be able to be reactivated. It must be weather proof, that is, able to withstand drastic changes in temperatures of the order of extreme cold to extreme hot temperature —40° F. to +190° F., sunrays, humidity, water and it must permanently maintain its adhesive characteristics. Examples of such glues are of the commercial hot melt glue type, such as polyester glues, as available at Jowat Germany or North Carolina, U.S.A., and at Swift Company in Canada.

In order to wrap around the core with said resinous paper, preferably the operation is conducted in a medium having a relative humidity of 13% to 15% in order to increase paper flexibility. Also it is preferable to use fresh paper, i.e. to use the paper as soon as it is made available, as it becomes hard and brittle with time.

The resin-impregnated paper used may be of the type available at International Paper's Uniwood Division at Statesville, N.C., or under the generic name resin-impregnated wood-fiber veneer.

Other wrapping paper or glue may be used if desired: for instance glues containing other thermoplastic resins, polyvinylacetate glues, polyamines glues.

Once the wrapping operation is completed the resin-impregnated paper is generally painted with a thermosetting paint such as acrylic or polyurethane paints and the like, having a long life expectancy of fifteen years or more as is well known in the art. If desired, the resin paper may be heat calendered or heat embossed, prior to glueing or thereafter, as is also known in the art.

The final product may be used for exterior sidings, but also as a pre-finished wood, such as for basements, or as decorating panels. It could be used to shelve collection pieces and the like.

The following will serve to illustrate preferred embodiments of the invention.

EXAMPLE 1

Asphalt emulsion was added to a mixer 14 via line 12 while a 1% softwood-fibre aqueous suspension of the type which would normally be used for making fibre-board fibre was delivered via line 12. (Hardwood-fibre may be used if desired.) The asphalt was delivered at such a rate that it represents 20% by weight of the finished core product. In the mixer 14, the solution was adjusted to a pH 4-4.5 and then fed into reservoir 20. The mat so made into roll 22 had a thickness of about $\frac{3}{4}"$. The mat was roll-squeezed under pressure in the range of 30 psi±10 and dry heated at about 400° F. for about $1\frac{1}{4}$ hours. At this stage the board so obtained had a thickness of about 15/32". Then as described above it was cut, finished and glued with a resin-impregnated paper and finally painted with a thermosetting acrylic paint. The product obtained had the properties as defined under Product Number 1. The product so made was compared against other exterior sidings which are presently made commercially available.

| Product Number | |
| --- | --- |
| 2 | designates a hardboard siding |
| 3 | designates a hardboard siding from a different source |
| 4 | designates a vinyl siding |
| 5 | designates an aluminum siding |

Results are shown in Table 1.

TABLE 1

PHYSICAL PROPERTIES COMPARISON

| Product Number | 1 | 2 | 3 | 4 | 5 |
| --- | --- | --- | --- | --- | --- |
| Thickness (inch) | $\frac{1}{2}$ | $\frac{3}{8}$ | $\frac{3}{8}$ | 0.050 | 0.022 |
| Thermal resistance (approx.) (R value -) | 1.2 | 0.55 | 0.55 | 0.10 | 0.0 |
| Breaking load (lb/in$^2$) | 72 | 70 | 105 | 0.9* | 1.6* |
| Modulus of rupture (lb./in$^2$) | 1 400 | 2 800 | 3 900 | — | — |
| Density (lb/cu.ft.) | 24 | 48 | 57 | 89 | 178 |
| Weight of a plank (lb) (9" × 12) | 7.5 | 13 | 16 | 3.3 | 2.9 |
| Quazi-maximum linear expansion (%) (40 to 98% RH) | 0.417 | 0.438 | 0.306 | 0.263 | 0.145 |
| Water absorption 2 hrs. (% volume) | 3.00 | 2.8 | 0.9 | — | — |
| *After boiling for 1 hour in water* | | | | | |
| 1. Water absorption (% vol.) | 15.0 | 48.0 | 42.2 | — | — |
| 2. Thickness swelling (%) | 8.0 | 20.0 | 27.5 | — | — |
| *Paint washability (cycles)* | | | | | |
| First removal | 7 000 | 3 000 | 10 000 | 10 000 | 1 300 |
| Appreciable removal | 10 000 | 10 000 | 10 000 | 10 000 | 10 000 |
| *Fasteners holding* | | | | | |
| Direct nail withdrawal (lb) | 5.3 | 17.3 | 18.7 | 16.0 | 2.1 |
| Nail head pull through (lb) | 97 | 183 | 213 | 119 | 204 |
| Lateral nail resistance (lb) | 129 | 304 | 201 | 66 | 104 |
| *Impact resistance "falling ball"* | | | | | |
| Top side dent (inch) | 14 | 31 | 33 | 90 | 10 |
| Bottom side failure (inch) | 30 | 40 | 42 | 90 | 90 |
| *no rupture but $3\frac{1}{2}$ inches deflection | | | | | |
| Cutting | Electric or Hand Saw | Electric Saw | Electric Saw | Electric Saw | Metal scissors or electric saw |
| Cut | Neat | Chip Paint | Chip Paint | Neat | |
| Nailing | Normal Nails | Hot-dipped Nails | Hot-dipped Nails | Normal Nails | |

DISCUSSION

As evidenced from table 1, the R value indicative of the thermal resistance is superior to most presently existing sidings. As compared to hardboard the quasi-maximum linear expansion is about the same. The weight is less than half for comparable breaking loads.

The fasteners holding power is adequate for exterior sidings: it is even superior to vinyl and aluminium commercial sidings. It can be easily repaired with fillers such as plastic woods, it is comparable to hardboard.

Other properties are comparable to one type or the other type of sidings except for the moisture or water absorption or thickness swelling where the new product is more stable than others known hardboard types.

This latter experiment was carried out as follows:

A two-compartment box was made with a common wall defined by a panel from each of product No. 1, 2, and 3 respectively, one of the compartments was subjected to a temperature of 56° under extreme dry conditions artificially created with a drying hygroscopic substance placed in a container, while the other compartment was maintained at 96° F. under very humid conditions by the presence of water in containers. The panels making the common wall were regularly shifted so that each would equally and alternatively occupy one portion of the common wall. Results are shown in Table 2.

TABLE 2

| PRODUCT NUMBER | 1 | 2 | 3 |
|---|---|---|---|
| Length (in.) at beginning | 11.043 | 11.043 | 11.036 |
| Length after 4 months | 11.057 | 11.069 | 11.073 |
| Length gain | 0.014 | 0.026 | 0.037 |
| % of gain | 0.127 | 0.235 | 0.335 |
| Weight at beginning | 161.38 | 269.71 | 241.81 |
| Weight at the end | 171.51 | 295.82 | 269.08 |
| Weight gain | 10.13 | 26.11 | 27.27 |
| % of gain | 6.28 | 9.68 | 11.28 |
| Thickness at beginning | 0.488 | 0.349 | 0.396 |
| Thickness at the end | 0.508 | 0.393 | 0.427 |
| Thickness gain | 0.020 | 0.044 | 0.031 |
| % Gain | 4.10 | 12.61 | 7.83 |

This is not accidental, because mid-way between the beginning and the end of the experiment, in table 2, the results shown in table 3 were obtained:

TABLE 3

| % of gain in: | PRODUCT NUMBER | | |
|---|---|---|---|
| | 1 | 2 | 3 |
| Length | 0.187 | 0.539 | 0.254 |

TABLE 3-continued

| % of gain in: | PRODUCT NUMBER | | |
|---|---|---|---|
| | 1 | 2 | 3 |
| Weight | 8.70 | 25.19 | 12.36 |
| Thickness | 3.69 | 11.09 | 13.18 |

As a tentative explanation to which applicant does not want to be limited, it would appear that the great proportion of air cells in applicant's product seems to account for the high thermal resistance.

This also would seem to account for the great dimensional stability of the product even under drastic conditions such as under boiling water for 1 hour. In fact the air volume would be up to twice that generally encountered in normal hardboard panels. It seems that any increase in wood cells would tend to be absorbed within the core voids thereby cooperating in offering this dimensional stability.

Having described the present invention, modification will be evident by those skilled in the art without departing from the spirit of the invention as defined in the appended claims.

I claim:

1. A rigid and light panel having a rigid core, and a wrapping enclosure surrounding said core, said rigid core comprising wood fibres and asphalt intimately mixed together, said asphalt being 10–30% by weight of said core, and at least 50% by volume of said core being air cells, said wrapping enclosure comprising a resin-impregnated paper glued to the rigid core so as to form a hard shell thereabout, said panel having a R value of at least 0.8.

2. The panel as defined in claim 1 wherein 15 to 25% by weight of said core is asphalt and 60 to 75% by volume of said core is made up of air cells and the glue is a hot melt-glue.

3. The panel as defined in claim 2 including a thermosetting finish on the exterior of the enclosure; the panel having a breaking load of about 72 lb/in$^2$.

4. The exterior siding as defined in claim 3 having a density from about 20 to about 28 lb./cu.ft. and a R value of about 1.1 to 1.3.

* * * * *